United States Patent Office 2,950,290
Patented Aug. 23, 1960

2,950,290
STABILIZED AROMATIC CARBOCYCLIC AMINES

Eugene V. Hort, Westfield, N.J., assignor to General Aniline & Film Corporation, New York, N.Y., a corporation of Delaware No Drawing. Filed June 21, 1956, Ser. No. 592,736

12 Claims. (Cl. 260—391)

This invention relates to the stabilization of aromatic carbocyclic amines against deterioration during storage.

It is well known in the chemical arts that aromatic amines are rapidly oxidized by contact with air. The combination of the aromatic amine and the oxidation products decreases the value of the aromatic amine, and as a consequence thereof, it cannot be employed in certain types of chemical reactions.

Aromatic amines and polyamines have a tendency to darken in color during storage, particularly at elevated temperatures. This oxidation or discoloration makes the aromatic amine or polyamine unsuitable as an intermediate for the manufacture of various azo dyes, chemical products and as curing or hardening agents for epoxy resins. In industrial practice, with steel equipment and steel shipping containers, this type of deterioration is of special importance. In the presence of iron, conventional stabilizers and anti-oxidants are often ineffective and in some cases act as a catalyst for the decomposition.

In order to overcome the foregoing shortcomings, it has been proposed to stabilize such aromatic amines by incorporating therein a small quantity of either an aliphatic thioamide, an amino methane sulfinic acid compound or its tautomeric forms, such as, for example, N-propylamino methane sulfinic acid or a phosphorus sulfide reaction product of a phenolic compound, such as, for example, 2,6-di-tertiary-butyl-4-methyl phenol, tertiary butyl derivative of mixed cresols and mixture of ortho-, para- and meta-cresols. Inasmuch as all of these compounds and reaction products contain sulfur, their introduction into aromatic amines is highly undesirable since they function, even though slowly, as cataylsts for the decomposition. Moreover, they are inoperative with certain types of aromatic amines and actually increase the susceptibility of such amines to oxidation.

It is an object of the present invention to provide a class of aromatic carbocyclic amines and polyamines which are stabilized against deterioration during storage, even in the presence of iron.

Another object is to provide a novel and improved method for stabilizing aromatic carbocyclic amines and polyamines.

Further objects and advantages will become more clearly manifest from the following description:

I have found that aromatic carbocyclic amines and polyamines can be very readily and efficiently stabilized against oxidation and deterioration by incorporating into said amine a stabilizing amount of an organic phosphite characterized by the following general formula:

(R)$_3$PO$_3$ wherein R represents a member selected from the class consisting of alkyl, aryl and aralkyl groups.

The compounds characterized by the foregoing formula are organic phosphites, i.e. trialkyl, triaryl, or triarakyl phosphites. Many of them are commercially available, and those that are not can be very rapidly prepared by procedures well known to the art. They are usually prepared by the esterification of three moles of an aliphatic or aromatic alcohol with one mole of phosphorus acid.

As illustrative examples of such organic phosphites, the following may be mentioned:

Triethyl phosphite
Tri-n-butyl phosphite
Tri-isoamyl phosphite
Tridecyl phosphite
Tricetyl phosphite
Tricyclohexyl phosphite
Triphenyl phosphite
Tricresyl phosphite
Tribenzyl phosphite The foregoing and equivalent organic phosphites are very efficient stabilizers and anti-oxidants for aromatic amines and polyamines regardless whether they are in liquid or solid form. They effectively inhibit oxidation, and prevent deterioration when such amines and polyamines are stored or transported in steel shipping containers. The amount to be employed will depend upon the particular aromatic amine or polyamine. This can be very readily determined by simple routine spot experiments. I have found, however, that in general, an amount ranging from about 0.01 part to 1.0 part by weight of any one of the above listed organic phosphites is sufficient to stabilize 100 parts by weight of a liquid or solid aromatic amine or polyamine. The organic phosphites are also effective in protecting aromatic amines and polyamines in steel equipment for long periods of time prior to the utilization of the amine as an intermediate in chemical processes.

The aromatic amines and polyamines which may be effectively stabilized by the organic phosphites, are those which are either liquid or solid at room temperature. The nature or character of the substituents in the aromatic nucleus is immaterial. The organic phosphites are excellent anti-oxidants and stabilizers for all aromatic amines and polyamines even though they contain as substituents, acid groups such as carboxyl, sulfate, sulfonic acid groups, and the like. As examples of such amines and polyamines, the following are illustrative:

Aniline
o-, m-, p-Toluidines
Xylidine
o-, m-, p-Aminophenols
o-, m-, p-Phenylenediamines
Benzidine
α-Naphthylamine
β-Naphthylamine
o-, m-, p-Chloroanilines
4-benzyl phenylamine
2,4-toluenediamine
2,6-toluenediamine
Methylene-bis aniline
1-chloro-2,4-phenylenediamine
Diphenyl-3,3'-dimethoxy-4,4'-diamine
1,3-phenylenediamine
Naphthalene 1,4-diamine
Naphthalene 1,5-diamine
Xylylene diamine
4,4',4''-triphenyl methane triamine
Benzene-1,3,5-triamine In order to more clearly illustrate the invention and to show the preferred mode of carrying the same into effect, and the advantages resulting therefrom, the following examples are given:

Example I

A sample of m-chloroaniline was distilled in all-glass equipment in the usual manner. The distillate was divided into two 100 gram portions, one portion with no additive and the other portion stabilized with 0.1 part by weight of triphenyl phosphite. To each sample a small ball of steel wool was added. The samples were covered and allowed to stand for sixteen hours in a heated oven maintained at 95° C. The unstabilized distillate was orange in color, whereas the stabilized sample was pale yellow, the original color of the distillate.

*Example II*

A 100 gram portion of an undistilled high purity grade of p-toluidine was stabilized with 0.1 part by weight of triphenyl phosphite. A similar portion was reserved as the control. Both samples, in open glass containers, were placed in an oven and kept at 95° C. for 90 hours. The stabilized p-toluidine showed no darkening in color, whereas the control showed a medium brown color, thus indicating atmospheric oxidation.

*Example III*

To 100 grams of α-naphthylamine 0.1 part by weight of tributyl phosphite was added and the mixture placed in a rotating ball mill for a period of one hour so as to evenly distribute tribenzyl phosphite. The ground sample was then placed in an open glass vessel and allowed to remain at room temperature for a period of one week. A control sample of the same weight of α-naphthylamine was also allowed to stand at room temperature in an open glass vessel for the same period of time. The unstabilized sample, i.e. control, turned reddish, whereas the stabilized sample showed a very slight tint of red, and for practical purpose could be considered white.

*Example IV*

Example III was repeated with the exception that the α-naphthylamine was replaced by an equivalent amount of 2,4,6-triaminotoluene. The unstabilized sample, i.e. control, turned color while the stabilized sample showed no change in color.

*Example V*

100 grams of freshly distilled aniline were stabilized with 0.5 part by weight of triethyl phosphite. After one week's storage at room temperature in a steel container, the stabilized sample was light tan whereas the color of the control was brown.

*Example VI*

Freshly distilled o-phenylene diamine was melted with 0.1 part by weight of tribenzyl phosphite. The melt was cooled and then ground. After one month's storage in a steel container, the stabilized sample was unchanged whereas an unstabilized control sample darkened in color.

*Example VII*

Example VI was repeated with the exception that the tribenzyl phosphite was replaced by an equivalent amount of tricyclohexyl phosphite. After one month's storage in a steel can, the stabilized sample was unchanged whereas the unstabilized control sample darkened considerably.

*Example VIII*

Example VI was again repeated with the exception that the o-phenylenediamine was replaced by an equivalent amount of 3-aminophenol. After one month's storage in a steel can, the stabilized sample was unchanged whereas the unstabilized control sample darkened considerably.

I claim:
1. An aromatic carbocyclic compound, selected from the group consisting of aromatic carbocyclic amines and polyamines stabilized against deterioration by steel by having incorporated therewith from 0.01 to 1.0 part by weight per 100 parts by weight of said aromatic carbocyclic compound of an organic phosphite having the general formula:

$$(R)_3PO_3$$

wherein R represents a member selected from the class consisting of ethyl, butyl, isoamyl, decyl, cetyl, cyclohexyl, phenyl, cresyl and benzyl groups.

2. A stabilized composition of matter according to claim 1, wherein the organic phosphite is triphenyl phosphite.

3. A stabilized composition of matter according to claim 1, wherein the organic phosphite is tributyl phosphite.

4. A stabilized composition of matter according to claim 1, wherein the organic phosphite is triethyl phosphite.

5. A stabilized composition of matter according to claim 1, wherein the organic phosphite is tribenzyl phosphite.

6. A stabilized composition of matter according to claim 1, wherein the organic phosphite is tricyclohexyl phosphite.

7. In the method of stabilizing an aromatic carbocyclic compound selected from the group consisting of aromatic carbocyclic amines and polyamines, against deterioration by steel, the improvement which consists in the step of adding to the aromatic carbocyclic compound from 0.01 to 1.0 part by weight per 100 parts by weight of said aromatic carbocyclic compound of an organic phosphite of the formula:

$$(R)_3PO_3$$

wherein R represents a member of the class consisting of ethyl, butyl, isoamyl, decyl, cetyl, cyclohexyl, phenyl, cresyl and benzyl groups.

8. The method according to claim 7 wherein the organic phosphite is triphenyl phosphite.

9. The method according to claim 7 wherein the organic phosphite is tributyl phosphite.

10. The method according to claim 7 wherein the organic phosphite is triethyl phosphite.

11. The method according to claim 7 wherein the organic phosphite is tribenzyl phosphite.

12. The method according to claim 7 wherein the organic phosphite is tricyclohexyl phosphite.

References Cited in the file of this patent

UNITED STATES PATENTS

| | | |
|---|---|---|
| 2,294,211 | Rothrock | Aug. 25, 1942 |
| 2,307,158 | Reynolds et al. | Jan. 5, 1943 |
| 2,365,974 | Schreiber | Dec. 26, 1944 |
| 2,391,184 | Nelson et al. | Dec. 18, 1948 |
| 2,510,849 | Zimmer et al. | June 6, 1950 |

OTHER REFERENCES

Kosolapoff: Organophosphorus Compounds, Wiley and Sons, Inc., New York (1950), page 199 relied on.